United States Patent [19]

Leis et al.

[11] Patent Number: 4,908,841
[45] Date of Patent: Mar. 13, 1990

[54] DATA DECODING CIRCUIT INCLUDING PHASE-LOCKED LOOP TIMING

[75] Inventors: Michael Leis; Michael J. Muchnik, both of Framingham; Elmer Simmons, Whitman, all of Mass.; Russell Brown, Nepean, Canada; Bernardo Rub, Shrewsbury, Mass.

[73] Assignee: Digital Equipment Corporation, Maynard, Mass.

[21] Appl. No.: 115,238

[22] Filed: Oct. 30, 1987

[51] Int. Cl.4 .............................................. H03D 3/24
[52] U.S. Cl. ........................................ 375/81; 375/95; 329/311; 331/1 A
[58] Field of Search ................... 375/120, 81, 95, 118, 375/119; 329/104, 50; 307/518; 328/119; 331/1 A

[56] References Cited

U.S. PATENT DOCUMENTS

| | | | |
|---|---|---|---|
| 4,737,866 | 4/1988 | Ebata | 375/120 |
| 4,750,193 | 6/1988 | Bailey | 375/120 |

OTHER PUBLICATIONS

"Clock Recovery Phase-Locked Loop", IBM Technical Disclosure Bulletin, vol. 29, No. 10 (Mar., 1987), pp. 4427–4428.

W. C. Lindsey, et al., "Telecommunication Systems Engineering", Prentice-Hall, 1973) pp. 442–443 and 458–459.

Primary Examiner—Robert L. Griffin
Assistant Examiner—Marianne Huseman
Attorney, Agent, or Firm—Fish & Richardson

[57] ABSTRACT

A data decoding circuit which receives an input signal comprising a sequence of pulses and generates a digital data output signal and timing signals in response thereto. The circuit includes a phase-locked loop which generates timing signals in response to the input signal and an offset signal from a data separator circuit. The data separator circuit generates the digital data output signal and the offset signal, which measures the degree of correlation between the input signal as received by the data separator and the timing signal from the phase-locked loop, thereby obviating the need to match the data separator circuit closely to the phase-locked loop.

18 Claims, 3 Drawing Sheets

DATA DECODING CIRCUIT INCLUDING PHASE-LOCKED LOOP TIMING

BACKGROUND OF THE INVENTION

1. Field of the Invention

The invention relates generally to the field of electronic circuitry and more specifically to phase-locked loop circuits for deriving data signals and timing signals from an input signal having both data and timing encoded therein.

2. Description of the Prior Art

Phase-locked loop circuits are used in many applications to derive a digital data signal and one or more timing signals from a single input signal, thereby obviating the need to provide separate timing signals along with the data input signal. The input signal is typically in the form of a pulse train, with the presence or absence of a pulse at a particular time indicating the value of a bit of digital data. The receiving units receiving the pulse train must receive the sequential pulses comprising the input signal, determine the proper timing relationships between consecutive pulses and from that determine whether a pulse is present or absent at the required time so as to identify the value of the digital data bit which is then being transmitted and transfer the bit to downstream processing circuitry. In addition, the receiving unit must generate timing signals which are used to clock the downstream processing circuitry.

Generally, a unit which transmits a data pulse train is designed to transmit the pulse train with a timing or frequency approximating a predetermined value, and the receiving unit is designed with timing circuits which assume the approximate timing value. However, because of timing tolerances which must be assumed in mass-produced equipment, the receiving units must allow for some variations in timing. Furthermore, and more important, receiving units must be able to accommodate a wide variation in phase of the incoming signal, since they cannot assume that the pulses will begin or end at any particular time.

Phase-locked loop timing circuits are used in receiving units to receive the incoming pulse stream and generate timing signals for use in decoding the pulse stream to derive the data signals therein. The frequencies of the timing signals generated by the phase-locked loop circuit are related to the particular optimal pulse frequency for which the transmitting circuits are also designed, but the frequencies may be adjusted up or down to accommodate the variations in timing which may be due to variations in the transmitting units. In addition, the phase-locked loop circuit may adjust the phases of the timing signals which it generates to accommodate the phase of the incoming pulse train.

Generally, a phase-locked loop circuit includes a voltage controlled oscillator which can generate a timing signal having a range of frequencies, generally centered around the frequencies at which the transmitting units are expected to generate the pulse train. The particular frequencies of the timing signals from the voltage controlled oscillator are related to the level of a control voltage applied thereto. A phase comparator compares the phase of the incoming pulse train with the timing signals from the voltage controlled oscillator and controls a charge pump which generates the control voltage applied to the voltage controlled oscillator. If an input pulse is early in comparison with timing signal from the voltage controlled oscillator, the frequency of the voltage controlled oscillator must be increased to, in part, advance the phases of the timing signal. Accordingly, the phase comparator enables the charge pump to adjust the control voltage so as to enable the voltage controlled oscillator to increase the frequencies of the timing signals generated thereby. The amount of adjustment of the control voltage, and thus, the frequency of the voltage controlled oscillator, is related to the time lag between the appearance of the pulse and the timing signal from the voltage controlled oscillator.

As the frequency of the voltage controlled oscillator increases, the rate at which timing pulses generated thereby also increases, and so the sequential pulses of the timing signal are transmitted earlier and earlier so as to more closely correspond to the timings of the pulses of the incoming data signals. As the timing signals from the voltage controlled oscillator get closer to the timings of the pulses, the phase comparator allows the control voltage to approach a steady-state level, allowing the frequency and phase of the voltage controlled oscillator to approach the frequency and phase of the incoming pulse train.

Similarly, if the pulses from the pulse train are delayed from the timing signals produced by the voltage controlled oscillator, the phase comparator enables the charge pump to adjust the control voltage applied to the voltage controlled oscillator to enable the voltage controlled oscillator to generate timing signals of lower frequency. Accordingly, the sequential pulses of the timing signals are delayed to match the timings of the sequential pulses of the input signal, thereby enabling the timing signals of the output of the voltage controlled oscillator to match the phase and timing of the pulses of the input signal.

The input data pulses and the timing signals from the voltage controlled oscillator are also used by a data separator which generates the actual data signal which is transmitted to the downstream processing circuitry. Since the data separator is the actual unit which uses the timing signals from the voltage controlled oscillator, it is desirable that the components thereof closely match the components of the phase comparator which is controlling the voltage controlled oscillator, otherwise the timing signals from the voltage controlled oscillator and the data output signal from the data separator are likely to become misaligned. Accordingly, the minimum pulse spacing of the input signal, which is related to the maximum data rate which the receiving unit may receive, is limited by the differences between the phase comparator and data separator and manufacturing tolerances in any receiving unit.

SUMMARY OF THE INVENTION

The invention provides a new and improved receiving unit for receiving an input pulse train signal and deriving therefrom data and timing signals.

In brief summary, the invention provides a new receiving circuit which includes a phase-locked loop circuit which generates timing signals in response to a pulse train from an input signal and a data separator which receives the input signal and the timing signals and generates in response thereto a data signal. The data separator also generates a timing trimmer signal related to timing differences between the pulse train as received by the data separator and timings of the data output signals generated thereby, on the one hand, and the timing signals from the phase-locked loop, on the other, which is used to control the timings of the timing signals generated by the phase-locked loop.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
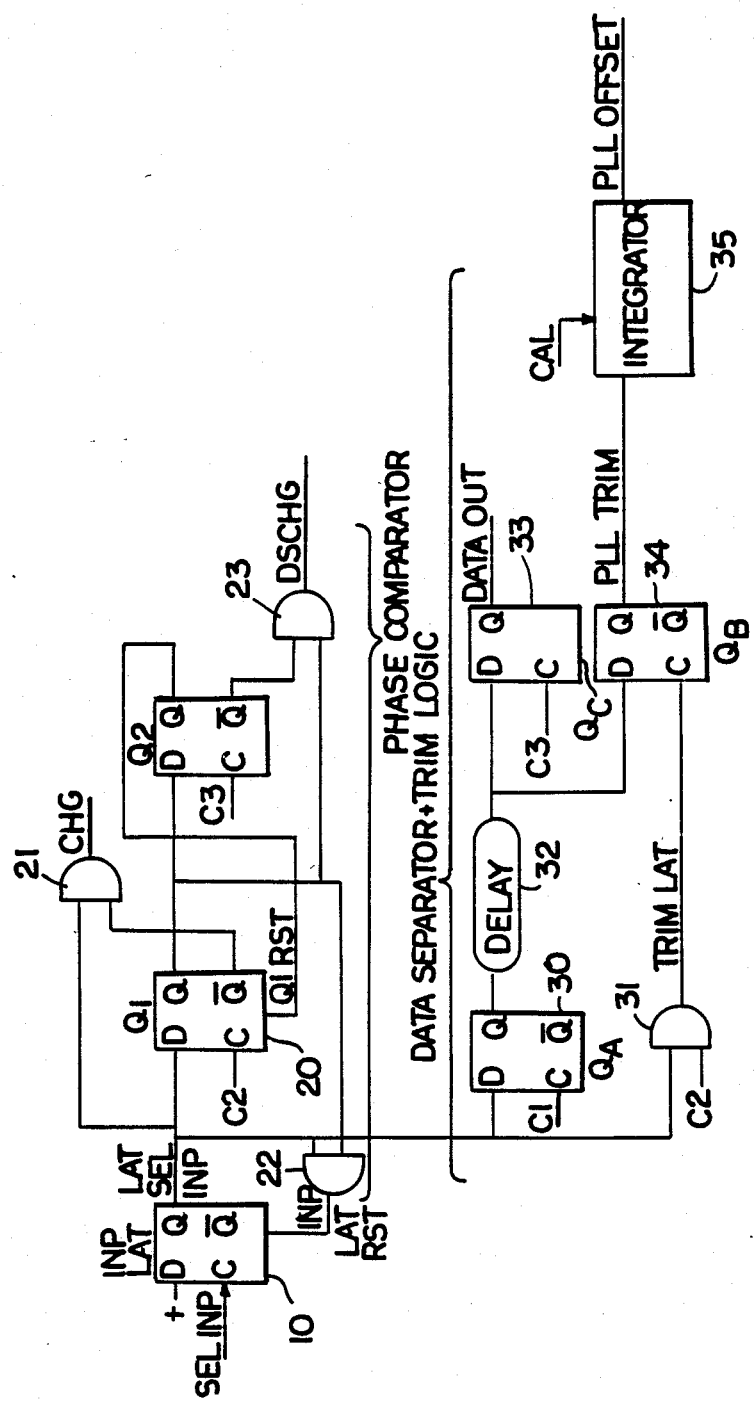
FIG. 1 is a functional block diagram of a receiving circuit constructed in accordance with the invention.

With reference to FIG. 1, a data decoding circuit constructed in accordance with the invention includes a multiplexer 10 which selectively couples a REF INP reference input signal or a DATA INP data input signal as a SEL INP selected input signal to an input latch 11. Both the REF INP reference input signal and the DATA INP data input signal are in the form of a pulse train, that is, a series of pulses. The REF INP reference input signal is a reference in which the pulses forming the REF INP reference input signal are at precisely-defined intervals. The DATA INP signal is a data signal from a data source (not shown) and so the pulses forming the DATA INP data input signal may be at somewhat random intervals, with the limitation, as is known in the art, that the pulses must be sufficiently often to ensure that the circuit does not track out of synchronism with the incoming signal.

The multiplexer 10 selects one of the two input signals in response to a CAL calibrate signal from an external source (not shown). When the CAL calibrate signal is asserted, the phase-locked loop is in a calibrate mode in which the REF INP reference input signal is coupled to the input latch 11 and used to control timing of the data decoding as described below. On the other hand, when the CAL calibrate signal is not asserted, the data decoding circuit is in a normal operating mode in which the DATA INP data input signal is coupled to the input latch 11 to control the timing of the phase-locked loop.

The input latch 11 is a flip-flop whose data input D is connected to a high logic voltage level. The SEL INP selected input signal controls the flip-flop's clock input C so that a pulse in the SEL INP selected input signal sets the input latch 11, enabling it to assert a LAT SEL INP latched selected input signal. The LAT SEL INP latched selected input signal is coupled to a phase comparator 12, which forms part of a phase-locked loop, and a data separator and trim logic circuit 13. The phase comparator 12 compares the timings of the sequential pulses of the LAT SEL INP latched selected input signal and timing signals from a voltage controlled oscillator 14, which it receives over a CLKS clocks bus 15. As explained below in connection with FIGS. 2 and 3, the phase comparator 12 generates a CHG charge signal and a DSCHG discharge signal of durations related to phase differences between the LAT SEL INP latched selected input signal and the timing signals on bus 15. The phase comparator 12 also generates an INP LAT RST input latch reset signal which enables the input latch 11 to reset, thereby permitting it to receive the next pulse of the SEL INP selected input signal.

The data separator and trim logic circuit 13 also receives the LAT SEL INP latched selected input signal from input latch 11 and the timing signals from the CLKS clocks bus 15 and generates in response thereto a DATA OUT data output signal in a conventional non-return to zero form. In addition, the data separator and trim logic circuit 13 generates a PLL OFFSET phase-locked loop offset signal having high and low voltage levels which relate to the phase differences between the timing signals and the LAT SEL INP latched selected input signal as latched in the data separator and trim logic circuit 13 and a DATA OUT data output signal generated thereby.

The CHG charge, DSCHG discharge and PLL OFFSET phase-locked loop offset signals are received in a charge pump and filter circuit 16, which, in response thereto, generates a VCO CTRL voltage controlled oscillator control signal. The charge pump and filter circuit 16 controls the voltage level of the VCO CTRL signal so as to enable the voltage controlled oscillator 14 to vary its frequency from a predetermined selected frequency level, to thereby adjust the phases of the respective timing signals which it transmits over CLKS bus 15. Thus, the CHG charge and DSCHG discharge signals from the phase comparator 12, which are generated in a comparison between the timings, and thus the phase relationships, between the LAT SEL INP latched selected input signal and the timing signals from the voltage controlled oscillator 14 in turn enables the voltage controlled oscillator 14 to adjust the phase of the respective timing signals. The phase comparator 12, charge pump and filter circuit 16 and voltage controlled oscillator 14 thus form a phase-locked loop in which the phase and timings of the timing signals generated by the voltage controlled oscillator are controlled in response to the phase and timings of the input LAT SEL INP latched selected input signal.

In addition, in accordance with the invention, While the CAL calibrate signal is asserted allowing the REF INP reference input signal to be coupled through the multiplexer 10, the charge pump and filter circuit 16 also uses the PLL OFFSET phase-locked loop offset signal from data separator and trim logic circuit 13 in controlling the VCO CTRL voltage controlled oscillator control signal. During this time, the PLL OFFSET phase-locked loop offset signal from the data separator and trim logic circuit 13, which is related to phase differences between the timing signals from the voltage controlled oscillator 14 and the LAT SEL INP latched selected input signal as it is latched in the data separator and trim logic circuit 13, allowing a close relationship to be maintained between the phases of the timing signals from the voltage controlled oscillator 14 and of the DATA OUT data output signal.

The operation of phase comparator 12 and data separator and trim logic circuit 13 will be explained in connection with the logic diagram depicted in FIG. 2 and a timing diagram depicted in FIG. 3. Preliminarily, with reference to FIG. 3, the voltage controlled oscillator 14 transmits three timing signals over CLKS bus 15, namely, a free-running C1 timing signal having a selected frequency having an approximately fifty-percent duty cycle, a C2 timing signal which comprises a pulse train in which the pulses are synchronous with every other leading edge of the C1 timing signal, and a C3 timing signal which comprises a pulse train in which the pulses are synchronous with the other leading edges of the C1 timing signal. The pulse times of the C2 and C3 timing signals are indicated by the vertical lines in the timing diagram synchronous with the respective sequential leading edges of the C1 timing signal (FIG. 3).

Each of the sequential pulses of the C2 timing signal marks the beginning of a bit cell, and each of the sequential C3 timing signals marks the center of a bit cell. The bit cell defined by two sequential pulses of the C2 timing signal effectively denotes a time slot during which a pulse of the SEL INP selected input signal may be received. Otherwise stated, if a SEL INP selected input signal pulse is received at any time during the time slot, it is deemed to be received during the time slot and the data signal that is transmitted out for the time slot reflects that. The pulse of the C3 timing signal in the center of the bit cell, that is, half way between the pulses of the C2 timing signal, denotes the optimum time at which the SEL INP selected input signal, and specifically the leading edge thereof, is expected if it is in phase with the timing signals.

Figure 3:
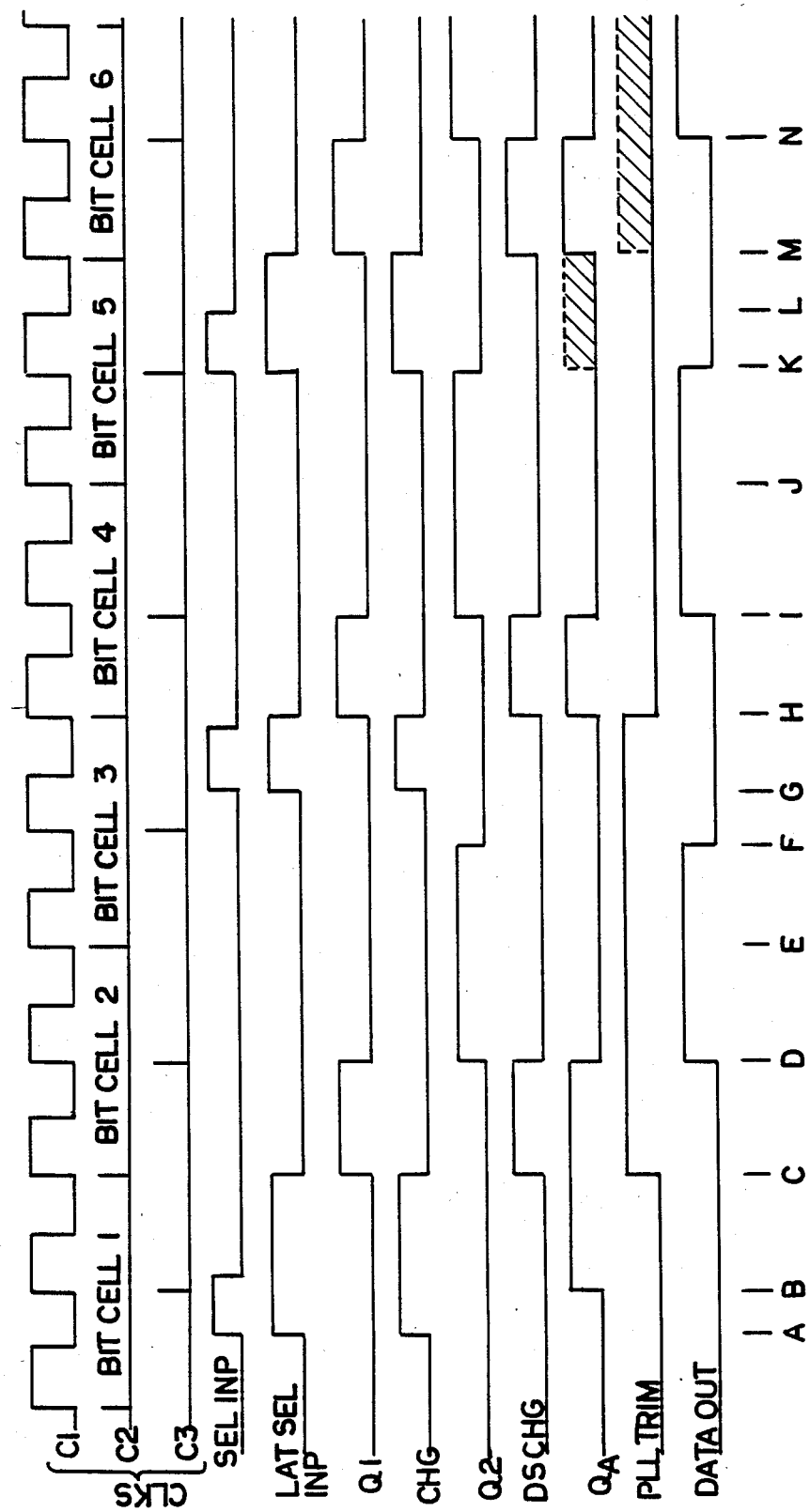
FIG. 3 is a timing diagram which is useful in understanding the operation of the circuit depicted in FIG. 2.

If the SEL INP selected input signal is out of phase with the timing signals, its leading edge is either ahead of (that is, to the left of, as shown in FIG. 3) or after (that is, to the right of, as shown in FIG. 3) the C3 pulse in the bit cell. Thus, the SEL INP selected input pulse during bit cell 1 is early in the bit cell, since its leading edge is to the left of the C3 pulse during the bit cell. The SEL INP selected input pulse during bit cell 3 is late in the bit cell, since its leading edge is to the right of the C3 pulse in the center of bit cell 3. Finally, the SEL INP selected input pulse during bit cell 5 is in phase with the timing signals, since its leading edge is simultaneous with the C3 pulse in the center of bit cell 5. There are no SEL INP selected input pulses during bit cells 2, 4 or 6.

Figure 2:
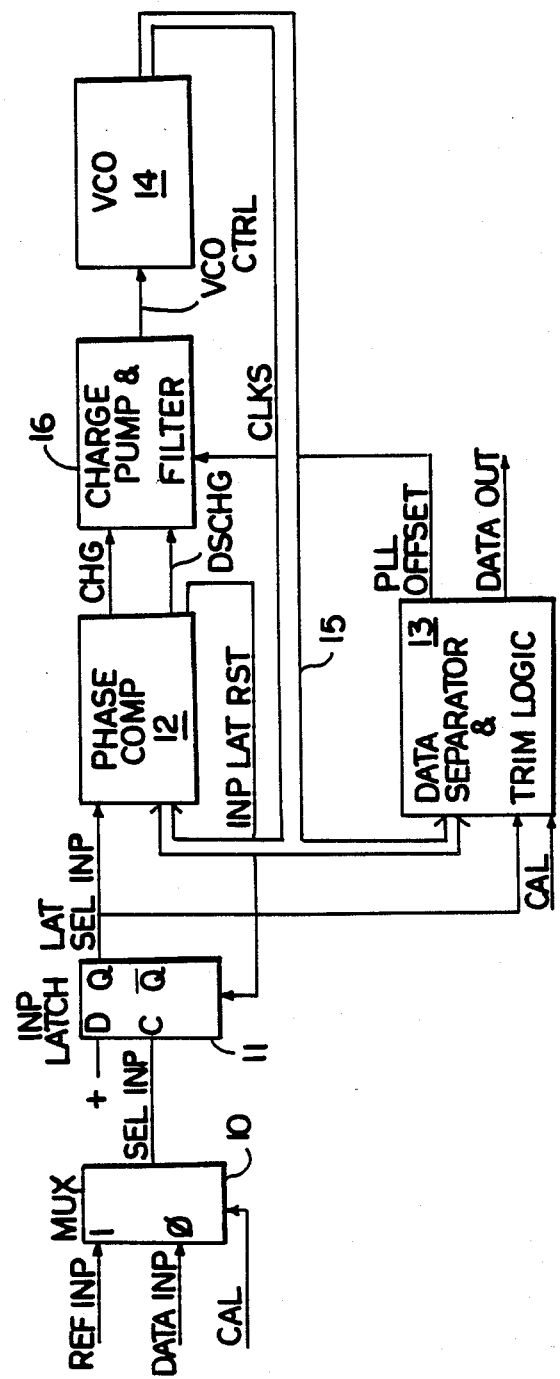
FIG. 2 is a logic diagram of a portion of the receiving circuit depicted in FIG. 1.

With this background, with reference to FIG. 2, the multiplexer 10 couples the SEL INP selected input signal to the input latch 11. In response to a pulse of the SEL INP selected input signal, the flip-flop comprising input latch 11 sets to assert the LAT SEL INP latched selected input signal. The LAT SEL INP latched selected input signal, in turn, is coupled to the data input terminal of a Q1 flip-flop 20 in the phase comparator 12 and the data input terminal of a QA flip-flop 30 in the data separator and trim logic circuit 13. In addition, the LAT SEL INP latched selected input signal is coupled to one input of an AND gate 31 in the data separator and trim logic circuit 13 and one input of an AND gates 21 and 23 in the phase comparator 12, thereby enabling the AND gates 21, 23 and 31 in response when the signal is asserted. The LAT SEL INP latched selected input signal is also coupled to enable one input of an AND gate 22.

With reference initially to the phase comparator 12 and the pulse received during bit cell 1, the Q1 flip-flop 20 is initially in its reset condition. Accordingly, its Q-bar output signal is asserted, which, in turn, enables AND gate 21. Thus, when the LAT SEL INP latched selected input signal is asserted (time A, FIG. 3), the AND gate 21 is energized, thereby asserting the CHG charge signal which is coupled to the charge pump and filter circuit 16. At the next C2 timing pulse (time C), the Q1 flip-flop 20 is set, de-energizing the AND gate and thereby negating the CHG charge signal. The CHG charge signal is thus asserted from time A (FIG. 3), which corresponds to the leading edge of the LAT SEL INP latched selected input signal (which, in turn, corresponds to the leading edge of the SEL INP selected input pulse from the multiplexer 10) to the next C2 timing pulse at time C.

The setting of the Q1 flip-flop 20 also enables the resetting of input latch 10. That is, since the LAT SEL INP latched selected input signal is asserted, AND gate 22 is energized. When the Q1 flip-flop 20 is set at time C (FIG. 3), its Q output signal is asserted, which energizes the AND gate 22. The AND gate 22 generates the INP LAT RST input latch reset signal. Thus, when AND gate 22 is energized, the INP LAT RST input latch reset signal is asserted, thereby resetting input latch 10 and negating the LAT SEL INP latched selected input signal. (While the resetting of input latch 10 and the negating of the LAT SEL INP latched selected input signal are depicted in FIG. 3 as being contemporaneous with the C2 timing signal at time C, it will be appreciated that they actually occur a short time later, as a result of gate delays through Q1 flip-flop 20, AND gate 22 and input latch 10.)

The asserted Q output signal from the set Q1 flip-flop 20 also enables one input of another AND gate 23. Since a Q2 flip-flop 24 is initially reset, the Q-bar output signal from the Q2 flip-flop 24 is asserted, and so when the Q1 flip-flop 20 is set at time C (FIG. 3), the AND gate 23 is energized thereby asserting the DSCHG discharge signal. In response to the next C3 timing pulse (time D, FIG. 3), the Q2 flip-flop 24 is set, de-energizing the AND gate 23 and thereby negating the DSCHG discharge signal. Thus, the DSCHG discharge signal is asserted during the time period between consecutive pulses of the C2 and C timing signals following a bit cell in which the SEL INP selected input signal is asserted.

In addition, the setting of the Q2 flip-flop 24 asserts its Q output signal, which provides a Q1 RST (Q1 reset) signal coupled to an overriding reset terminal of Q1 flip-flop 20. The asserted Q output signal from Q2 flip-flop 24 thus resets the Q1 flip-flop 20 thereby negating its Q output signal. In response to the next C3 timing pulse (time E, FIG. 3), the Q2 flip-flop 24 is reset, thereby negating the Q1 RST (Q1 reset) signal. Thus, the Q1 flip-flop 20 is in the required reset condition to receive the next pulse of the LAT SEL INP latched selected input signal. In addition, since the Q2 flip-flop 24 is reset, it, too, is in condition for the next pulse of the LAT SEL INP latched selected input signal.

As described above, FIG. 3 depicts three successive pulses of the SEL INP selected input signal, one at time A, a second at time G and the third at time K. The pulse of the SEL INP selected input signal at time A is early, that is, its leading edge is prior to (that is, to the left of, as depicted in FIG. 3) the C3 pulse in the center of the bit cell. Thus, the C1, C2 and C3 timing pulses are all out of phase with the SEL INP selected input signal by an amount of time corresponding to the delay between the leading edge of the SEL INP selected input signal and the C3 timing pulse in the center of the bit cell. The duration of the CHG charge signal, which corresponds to the time between the leading edge of the SEL INP pulse and the C2 timing pulse at the end of the bit cell, is thus longer than the duration of the DSCHG discharge signal, which corresponds to the time between the consecutive pulses of the C2 and C3 timing signals in bit cell 2. Since the CHG charge signal has a longer duration than the DSCHG discharge signal, the charge pump and filter circuit 16 (FIG. 1) enables the voltage level of the VCO CTRL voltage controlled oscillator control signal to enable the voltage controlled oscillator 14 to increase the frequencies of the C1, C2 and C3 timing signals.

At time G in bit cell 3 (FIG. 3), a pulse of the SEL INP selected input signal is also received. The various circuit elements of the phase comparator 12 depicted in FIG. 2 operate as described above in connection with the pulse received during bit cell 1. The received pulse of the SEL INP selected input signal, which is received at time G (FIG. 3), is late, that is, the leading edge of the pulse is after the C3 timing pulse during the bit cell. As a result, the frequencies of the C1, C2 and C3 clocking signals are too high. In this case, the CHG charge signal is asserted from time G to time H (FIG. 3), which is shorter than the time during which the DSCHG discharge signal is asserted, which is from time H to time I, that is, between the successive pulses of the C2 and C3 timing signal. Accordingly, the charge pump and filter circuit 16 adjusts the voltage level of the VCO CTRL voltage controlled oscillator control signal so as to enable the voltage controlled oscillator 14 to reduce the frequencies of the C1, C1 and C3 timing signals.

In bit cell 5 (between times J and M, FIG. 3), another pulse of the SEL INP selected input signal is also received (specifically, at time K), and the circuit elements of the phase comparator 12 again operate as described above in connection with the pulse during bit cell 1. The received pulse is contemporaneous with the C3 timing pulse, and so the duration of the CHG charge signal, which is between the leading edge of the SEL INP selected input signal (time K, FIG. 3) and the next C2 timing pulse at the end of the bit cell (time M, FIG. 3), corresponds to the duration of the DSCHG signal, which extends from the C2 timing pulse at which the CHG charge signal is negated to the next C3 timing pulse. Accordingly, the charge pump and filter circuit 16 generates a VCO CTRL voltage controlled oscillator control signal whose voltage level permits the voltage controlled oscillator to maintain the frequencies of the C1, C2 and C2 timing signals.

The data separator and trim logic circuit 13 generates the DATA OUT data output signal and the PLL OFFSET phase-locked loop offset signal. The value, that is, the voltage level, of the PLL OFFSET phase-locked loop offset signal is determined while the CAL calibrate signal is asserted, during which time the precise REF INP reference input pulses are coupled through multiplexer 10 (FIG. 1) as the SEL INP selected input signal. The value of the PLL OFFSET phase-locked loop offset signal relates to the degree of correlation, over a predetermined period of time, as determined by the asserted CAL calibrate signal, of the successive leading edges of the SEL INP selected input signal, or more specifically the LAT SEL INP latched selected input signal as received by and coupled through an input QA flip-flop 30, and the C1, C2 and C3 timing pulses from voltage controlled oscillator 14. After the value of the PLL OFFSET phase-locked loop offset signal has been determined and the CAL calibrate signal negated, the value of the PLL OFFSET phase-locked loop offset signal is used by the charge pump and filter circuit 16 to control the VCO CTRL voltage controlled oscillator signal, thereby controlling the voltage controlled oscillator 14.

In particular, if the data separator and trim logic circuit 13 determines that the LAT SEL INP latched selected input signal is early in a bit cell, then the PLL OFFSET phase-locked loop offset signal will have a higher value. On the other hand, if the data separator and trim logic circuit 13 determines that the LAT SEL INP latched selected input signal is late, the PLL OFFSET phase-locked loop offset signal has a lower value. However, if the data separator and trim logic circuit 13 determines that the LAT SEL INP latched selected input signal is in the center of the bit cell, the PLL OFFSET phase-locked loop offset signal will be constant. The value of the PLL OFFSET may be determined by a voltage level, or a digital data signal which the charge pump and filter circuit 16 may turn into an offset voltage value, which may provide an offset voltage for the VCO CTRL voltage controlled oscillator control signal to more closely align the timing signals produced by the voltage controlled oscillator 14 With the LAT SEL INP latched selected input signal as received by the data separator and trim logic circuit 13 and the DATA OUT data output signal produced thereby.

With reference to FIGS. 2 and 3, the QA flip-flop 30 in the data separator and trim logic circuit 13 receives the LAT SEL INP latched selected input signal from the input latch 10. Since, during bit cell 1, the SEL INP selected input signal is early, the asserted LAT SEL INP latched selected input signal is received at the data input terminal of QA flip-flop 30 prior to the receipt of the C1 timing pulse at the clock input terminal of the QA flip-flop 30 at time B. Accordingly, when the C1 timing pulse is received (time B), the QA flip-flop 30 is set, and its Q output signal is asserted.

As will be appreciated by those skilled in the art, the QA flip-flop 30 introduces a short delay, which is represented by delay 32, in coupling a latched signal from its input to its output. The asserted Q output signal from QA flip-flop 30 is coupled through delay 32 to the data inputs "D" of a data output flip-flop 33 and a trimmer flip-flop 34. By the next C2 timing pulse, the leading edge of the Q output signal from QA flip-flop 30 has reached the data input terminal of flip-flop 34.

At the next C2 timing pulse (time C, FIG. 3) at the end of the first bit cell, since the LAT SEL INP latched selected input signal has not yet been negated, it is still enabling AND gate 31. Accordingly, in response to the C2 timing pulse at time C, the AND gate 31 is energized to assert a TRIM LAT trimmer flip-flop latch signal. Since the signal at the data input terminal of the QB flip-flop 34 is asserted, the asserted TRIM LAT trimmer flip-flop latch signal, in turn, enables the QB flip-flop 34 to set, thereby asserting the PLL TRIM phase-locked loop trimmer signal (at time C, FIG. 3).

At the next C1 timing pulse (time D, FIG. 3), the LAT SEL INP latched selected input signal is not asserted. Accordingly, in response to the C1 timing pulse at time D, the QA flip-flop 30 is reset, thereby negating its Q output signal. However, as a result of the delay represented by delay 32, the trailing edge of the Q output signal from QA flip-flop 30 does not reach the data input terminals of QB and QC flip-flops until a predetermined amount of time later, corresponding to the delay represented by delay 32. In addition, at time D, a C3 timing pulse occurs. Since the Q output signal from QA flip-flop 30 is, because of the delay represented by delay 32, still asserted at the data input of QC flip-flop 33, the QC flip-flop 33 is set to assert the DATA OUT data output signal.

At the next C1 timing pulse (time E, FIG. 3), the LAT SEL INP latched selected input signal, which was negated at time C, remains negated. As a result, the QA flip-flop 30, which is clocked by the C1 timing signal, remains in the reset condition. At the same time, voltage controlled oscillator generates a C2 timing pulse. Nevertheless, since the LAT SEL INP latched selected input signal is negated, the AND gate 31 is disabled, thereby maintaining the TRIM LAT trimmer flip-flop latch signal in a negated condition. As a result, the QB flip-flop 34 does not change state, and the PLL TRIM phase-locked loop trimmer signal remains in the asserted condition, as shown in FIG. 3.

At the next C1 timing pulse, which is contemporaneous with the next C3 timing pulse (time F, FIG. 3), the LAT SEL INP latched selected input signal is still negated, and so the QA flip-flop 30 remains in the reset condition. In addition, since the negated Q output signal from the QA flip-flop 30 has by this time propagated through the delay 32 to the data input of QC flip-flop 33, the C3 timing pulse (time F) resets the QC flip-flop 33, thereby negating the DATA OUT data output signal.

By the next C1 timing pulse, which is contemporaneous with the next C2 timing pulse (time H, FIG. 3), the LAT SEL INP latched selected input signal at the data input terminal of QA flip-flop 30 is asserted. Accordingly, at time H, the QA flip-flop 30 is set in response to the C1 timing pulse. The asserted Q output signal from QA flip-flop 30 is then asserted. However, the signal at the data input terminal of flip-flop 34, which corresponds to the Q output signal from the QA flip-flop 30 as delayed by delay 32, remains negated at time H.

When the C2 timing pulse is received by AND gate 31 at time H, the LAT SEL INP latched selected input signal, which was asserted at time G, is still asserted, thereby enabling AND gate 31. Accordingly, when the C2 timing pulse arrives at the enabled AND gate 31, the AND gate 31 is energized to assert the TRIM LAT trimmer flip-flop latch signal, which, in turn, resets the QB flip-flop 34 to negate the PLL TRIM signal.

At the next C1 timing pulse (time I, FIG. 3), which corresponds to the next C3 timing pulse, since the LAT SEL INP latched selected input signal at the data input to QA flip-flop 30 is negated, the QA flip-flop 30 is reset when clocked by the C1 timing pulse. Accordingly, the Q output signal from QA flip-flop 30 is negated.

However, when the C3 timing pulse is received by QC flip-flop 33 at time I, the signal at the data input, which corresponds to the Q output signal from QA flip-flop 30 as delayed by delay 32, is still asserted. Accordingly, the QC flip-flop 33 is set in response to the C3 timing pulse, thereby asserting the DATA OUT data output signal.

Since the LAT SEL INP latched selected input signal remains negated at the next C1 timing pulse (time J, FIG. 3), at time J the QA flip-flop 30 remains reset. By this time, the negated Q output signal from QA flip-flop 30 has propagated through the delay 32 and reached the data input terminals of both QB flip-flop 34 and QC flip-flop 34. At time J, however, the LAT SEL INP latched selected input signal is negated, disabling AND gate 31, and so when the C2 timing pulse is received at the AND gate, the TRIM LAT trimmer flip-flop latch signal remains negated. Accordingly, the QB flip-flop 34 does not change state at time J, and so the PLL TRIM phase-locked loop trim signal remains negated.

At time K, the next pulse of the C1 and C3 timing signals and the time when the SEL INP selected input pulse is correctly received in the center of the bit cell (specifically, bit cell 5), LAT SEL INP latched selected input signal is asserted, but, because of the gate delays inherent in the input latch 10, the asserted LAT SEL INP latched selected input is not received at the data input terminal of QA flip-flop 30 until after the C1 timing signal. Accordingly, the QA flip-flop 30 is not set at time K.

If the QA flip-flop 30 had been set at time K, then QB flip-flop 34 would be set at time M, at the time of the next C2 timing pulse, since the TRIM LAT trimmer flip-flop latch signal is asserted at that time. However, since the QA flip-flop 30 is not set at time K, the signal at the data input terminal of the QB flip-flop 34 remains negated at time M.

At time N (FIG. 3), since the LAT SEL INP latched selected input signal is now negated, in response to the C1 timing pulse the QA flip-flop 30 is reset, thereby negating the Q output signal therefrom. At time N, the C2 timing signal remains negated, and so the TRIM LAT trimmer flip-flop latch signal remains negated. Accordingly, the QB flip-flop 34 remains reset and the PLL TRIM phase-locked loop trimmer signal remains negated. However, at time N, a C3 timing pulse clocks QC flip-flop 33. At this point, the input signal to the data input terminal of the QC flip-flop 33 remains asserted, and so the DATA OUT data output signal is asserted, as shown in FIG. 3. As at times E and J (FIG. 3), in response to the next C3 timing pulse (not shown), the QC flip-flop 33 is reset, thereby negating the DATA OUT data output signal.

As shown in connection with the SEL INP selected input pulses in bit cell 1 (FIG. 3), if the SEL INP selected input pulse is early, as detected by the QA flip-flop 30, that is, if a C1 timing pulse which clocks the QA flip-flop 30 is delayed from a pulse of the SEL INP selected input signal, the QB flip-flop 34 asserts the PLL TRIM phase-locked loop trimmer signal, and it remains asserted as long as the condition. Alternatively, if the SEL INP selected input pulse is late (bit cell 3, FIG. 3), as detected by the QA flip-flop 30, that is, if a C1 timing pulse which clocks the QA flip-flop 30 is ahead of a pulse of the SEL INP selected input signal, the QB flip-flop 34 negates the PLL TRIM phase-locked loop trimmer signal and it remains negated as long as the condition exists.

When the phases and frequencies of the pulses of the timing signals from the voltage controlled oscillator are equal to the phases and frequencies of the pulses of the SEL INP selected input signal, as occurs at time K in bit cell 5 (FIG. 3), the QA flip-flop 30 is generally driven to a metastable or unpredictable state in response to a C1 timing pulse (which is shown by the cross-hatching in the QA line depicted between times K and M in FIG. 3), which may be resolved to a set or reset condition a short time after the C1 timing pulse is received. Over time, the QA flip-flop 30 will resolve to a set condition approximately fifty percent of the time and to a reset condition approximately fifty percent of the time. If the QA flip-flop 30 resolves to a set condition before time M (FIG. 3), the QB flip-flop 34 will be set at time M, whereas if it resolves to a reset condition before time M, the QB flip-flop 34 will be reset at time M. (This is shown by cross-hatching in the PLL TRIM phase-locked loop trimmer signal following time M, FIG. 3.)

Thus, it will be appreciated that, if the LAT SEL INP latched selected input signal, as input to QA flip-flop 30, is within a predetermined time of the C1 timing pulse as input to QA flip-flop 30, such as to drive the QA flip-flop 30 into a metastable state, the PLL TRIM phase-locked loop trimmer signal will be asserted and negated approximately the same amount of time. The PLL TRIM phase-locked loop trimmer signal is then integrated by an integrator 35 while the CAL calibrate signal is asserted to produce the PLL OFFSET phase-locked loop offset signal which is coupled to the charge pump and filter circuit 16. In this example, since the PLL TRIM phase-locked loop trimmer signal is asserted as often as it is negated, the integrator 35, when it integrates the PLL TRIM phase-locked loop trimmer signal, determines a zero value for the integral of the PLL TRIM phase-locked loop trimmer signal.

This will also occur if the LAT SEL INP latched selected input signal pulses consistently alternatingly early and late, in relation to the C1 timing pulses. However, if the LAT SEL INP latched selected input signal pulses received at the data input terminal of the QA flip-flop 30 are consistently early or late, the PLL TRIM phase-locked loop trimmer signal will be generally asserted or negated, and its integral as determined by the integrator 35 will be either a positive or negative value. The charge pump and filter circuit 16 may use this as an offset value in its generation of the VCO CTRL voltage controlled oscillator control signal so that the C1, C2 and C3 timing signals generated by the voltage controlled oscillator 14 are more closely aligned to the proper timings of the pulses of the LAT SEL INP latched selected input signal as received at the QA flip-flop 30.

The integrator 35 forms the integral of the PLL TRIM phase-locked loop trimmer signal in response to the asserted CAL calibrate signal, during which time the SEL INP selected input pulses constitute the precisely timed pulses of the REF INP reference input signal, and use it in adjusting the VCO CTRL voltage controlled oscillator control signal while the CAL calibrate signal is not asserted and the SEL INP selected input pulses comprise the DATA INP data input signal. Furthermore, the integral value may be latched by control circuitry (not shown) in the receiving unit which incorporates the system depicted in FIG. 1, such as a microprocessor, and used as an initial offset value when the system depicted in FIG. 1 is initialized.

It will be recognized that the fact that the QA flip-flop 30 is initially in a metastable state, which may resolve to a state which does not reflect the condition of the LAT SEL INP latched selected input pulse at that time, has no effect on the DATA OUT data output signal that is generated. Regardless of the condition into which the QA flip-flop 30 is resolved immediately following that C1 timing pulse, by the time the QC flip-flop 33 next receives a C3 timing pulse, the QA flip-flop 30 will be clocked to the proper state by an intervening C1 timing pulse. Accordingly, the QC flip-flop 33 will also be clocked to the proper condition, and so will generate a DATA OUT data output signal having the proper condition.

As an alternative to using an integrator 35 to generate the PLL OFFSET phase-locked loop offset signal, a microprocessor may be provided to periodically sample the PLL TRIM phase-locked loop trimmer signal while the CAL calibrate signal is asserted to develop a digital offset value. During normal operation, while the CAL signal is not asserted, the microprocessor may use the digital offset value which it generated to control a digital to analog converter to, in turn, generate the PLL OFFSET phase-locked loop offset signal.

The use of a microprocessor to control the PLL OFFSET phase-locked loop offset signal also allows other elements of a system including the data decoding circuit depicted in the Figs. to at least partially control the PLL OFFSET phase-locked loop offset signal, which, in turn, controls the timing of the respective C2 and C3 pulses. For example, if the integrity of the digital data represented by the DATA INP data input signal is protected by a conventional error correction and detection codes, downstream circuitry which uses the digital DATA OUT signal may determine whether errors exist in the data which it receives and control the microprocessor to adjust the PLL OFFSET phase-locked loop offset signal to try to, in turn, adjust the timing of the bit cells defined by the sequential C2 timing pulses. In some cases, adjusting the timing of the bit cells can reduce the bit error rate of the data represented by the DATA OUT signal.

In addition, the PLL OFFSET phase-locked loop offset signal may be useful in connection with testing of the data decoding circuit. In particular, the data decoding circuit may be operated, both in the calibrate mode and in the normal operating mode during which the CAL calibrate signal is negated, for a selected amount of time, and the ability of the circuit to maintain the PLL OFFSET phase-locked loop offset signal at a constant voltage level is a measure of the ability of the circuit to maintain constant timing of the C1 C2 and C3 timing signals during operation.

Finally, with a slight modification to the data decoding circuit depicted in the Figs., the circuit as modified can be used in a read circuit used in a disk subsystem in a digital data processing system to minimize pulse pairing errors which may arise. Pulse pairing errors arise in disk subsystems if two magnetic transitions are close together, in which case peaks in the analog signal from the read head are forced apart. If the peaks are forced apart too far, the data separator circuit used in generating the digital data may determine the data negated-to-asserted transitions in the DATA INP data input signal (FIG. 1) to be in the wrong bit cells. To correct this, two flip-flops may be provided for flip-flop 34, clocked in response to a transitions of opposing polarities. In that case, the signal which controls the integrator 35 (or the microprocessor if one is used instead of integrator 35) is the sum of the output signals from the two flip-flops, and a pulse pairing offset, which is used in controlling a conventional comparator used in generating the digital signal from the analog signal from the read head, is the difference between the signals from the two flip-flops.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data decoding circuit for receiving an input signal comprising a pulse stream and generating in response thereto a data signal and timing signals comprising:

A. phase-locked loop means comprising:
  i. voltage controlled oscillator means for generating timing signals in response to a control signal, said voltage controlled oscillator means generating a free-running timing signal defined by a series of pulses having a selected frequency and a bit cell timing signal defining a bit cell and a receive time timing signal both defined by a series of pulses of one half said selected frequency and alternatingly contemporaneous with pulses of said free-running timing signal; and ii. phase comparison means comprising:

a. charge means connected to receive said input signal and said bit cell timing signal for generating a charge signal for a period of time starting from the beginning of said input signal to the end of said bit cell; and b. discharge means connected to said charge means and connected to receive said receive time timing signal for generating a discharge signal for a period of time starting from the end of said charge signal to said receive time timing signal;

iii. charge pump means connected to said phase comparison means and said voltage controlled oscillator means for generating the control signal, the control signal having a voltage level related to said charge and discharge signals and an offset signal;

B. data separator means for generating said data signal and said offset signal in response to said input signal and said timing signals, said offset signal representing the degree of correlation between the timing signals and the input signal as received by said data separator means.

2. A data decoding circuit as defined in claim 1 wherein:

A. said charge means comprises:

i. charge flip-flop means having a set condition and a reset condition, said charge flip-flop means being connected to receive said input signal and clocked in response to said bit cell timing signal to the set condition if said input signal is in an asserted condition contemporaneous with the receipt of said bit cell timing signal; and ii. charge coincidence means connected to said charge flip-flop means for generating said charge signal in response to the receipt of said input signal while said charge flip-flop means is in a reset condition;

B. said discharge means comprises:

i. discharge flip-flop means having a set condition and a reset condition, said discharge flip-flop means being connected to receive an output signal from said charge flip-flop means and clocked in response to said receive time timing signal to the set condition if said charge flip-flop is in the set condition contemporaneous with the receipt of said receive time timing signal, said discharge flip-flop means being further connected to said charge flip-flop means to reset said charge flip-flop means when in the set condition; and ii. discharge coincidence means connected to said discharge flip-flop means and said charge flip-flop means for generating said discharge signal while said charge flip-flop is set if said discharge flip-flop is not set.

3. A data decoding circuit as defined in claim 2 further comprising an input latch means for generating said input signal in response to the receipt of a data signal and input latch reset means connected to said charge flip-flop means for resetting said input latch means in response to the setting of said charge flip-flop means.

4. A data decoding circuit for receiving an input signal comprising a pulse stream and generating in response thereto a data signal and timing signals comprising:

A. phase-locked loop means for generating said timing signals in response to said input signal and an offset signal, said timing signals comprising a free-running timing signal defined by a series of pulses having a selected frequency and a bit cell timing signal and a receive time timing signal both defined by a series of pulses of one half said selected frequency and alternatingly contemporaneous with pulses of said free-running timing signal;

B. data separator means comprising:

i. data separator input means for latching said input signal and generating an output signal in response thereto and to said free-running timing signal from said phase-locked loop means, said data separator input means including an input flip-flop means having a set condition, a reset condition and a metastable condition and clocked in response to said free-running timing signal to the set or reset condition in response to the receipt or non-receipt of said input signal a selected time before said free-running timing signal, and otherwise being clocked to said metastable condition which resolves to a set condition or a reset condition a predetermined time thereafter;

ii. data value establishing means connected to said data separator input means for generating a data output signal in response to the output signal from said data separator input means and said receive time timing signal from said phase-locked loop means, said data value establishing means including a data value flip-flop means having a set condition and a reset condition and being clocked in response to said receive time timing signal to a set condition by said receive time timing signal if said input flip-flop means is set, and otherwise being reset; and iii. offset means connected to said data separator input means for generating said offset signal in response to the output signal from said data separator input means, said input signal and said bit cell timing signal from said phase-locked loop means, said offset means being connected to said data separator input means and generating said offset signal in response to the average condition of said input flip-flop means over a predetermined period of time.

5. A data decoding circuit as defined in claim 4 in which said offset means comprises:

A. offset flip-flop means having a set condition and a reset condition, said offset flip-flop mean being connected to said input flip-flop means and clocked by said bit cell timing signal, in response to the receipt of an input signal, to a set condition if said input flip-flop means is in its set condition and to a reset condition if said input flip-flop is in its reset condition; and B. integrator means connected to said offset flip-flop means for generating the offset signal indicative of the average condition of said offset flip-flop means over a selected period of time.

6. A data decoding circuit for receiving an input signal comprising a pulse stream and generating in response thereto a data signal and timing signals comprising:
   A. phase-locked loop means for generating said timing signals in response to said input signal and an offset signal, said timing signals comprising a free-running timing signal defined by a series of pulses having a selected frequency and a bit cell timing signal and a receive time timing signal both defined by a series of pulses of one half said selected frequency and alternatingly contemporaneous with pulses of said free-running timing signal;
   B. data separator means comprising:
      i. data separator input means for latching said input signal and generating an output signal in response thereto and said free-running timing signal from said phase-locked loop means, said data separator input means including an input flip-flop means having a set condition, a reset condition and a metastable condition and clocked in response to said free-running timing signal to the set or reset condition in response to the receipt or non-receipt of said input signal a selected time before said free-running timing signal, and otherwise being clocked to said metastable condition which resolves to a set condition or a reset condition a predetermined time thereafter;
      ii. data value establishing means connected to said data separator input means for generating a data output signal in response to the output signal from said data separator input means and said receive time timing signal from said phase-locked loop means; and
      iii. offset means connected to said data separator input means for generating said offset signal in response to the output signal from said data separator input means, said input signal and said bit cell timing signal from said phase-locked loop means, said offset means being connected to said data separator input means and generating said offset signal in response to the average condition of said input flip-flop means over a predetermined period of time.

7. A data decoding circuit as defined in claim 4 in which said offset means comprises:
   A. offset flip-flop means having a set condition and a reset condition, said offset flip-flop mean being connected to said input flip-flop means and clocked by said bit cell timing signal, in response to the receipt of an input signal, to a set condition if said input flip-flop means is in its set condition and to a reset condition if said input flip-flop is in its reset condition; and
   B. integrator means connected to said offset flip-flop means for generating the offset signal indicative of the average condition of said offset flip-flop means over a selected period of time.

8. A data decoding circuit for receiving an input signal comprising a pulse stream and generating in response thereto a data signal and timing signals comprising:
   A. an input latch for generating said input signal in response to the receipt of a data signal;
   B. phase-locked loop means comprising:
      i. voltage controlled oscillator means for generating timing signals in response to a control signal, said voltage controlled oscillator means generating a free-running timing signal defined by a series of pulses having a selected frequency and a bit cell timing signal and a receive time timing signal both defined by a series of pulses of one half said selected frequency and alternatingly contemporaneous with pulses of said free-running timing signal; and
      ii. phase comparison means comprising:
         a. charge means comprising:
            I. charge flip-flop means having a set condition and a reset condition, said charge flip-flop means being connected to receive said input signal and clocked in response to a bit cell timing signal to the set condition if said input signal is in an asserted condition contemporaneous with the receipt of said bit cell timing signal; and
            II. charge coincidence means connected to said charge flip-flop means for generating said charge signal in response to the receipt of said input signal while said charge flip-flop means is in a reset condition;
         b. discharge means comprising:
            I. discharge flip-flop means having a set condition and a reset condition, said discharge flip-flop means being connected to receive an output signal from said charge flip-flop means and clocked in response to a receive time timing signal to the set condition if said charge flip-flop is in the set condition contemporaneous with the receipt of said receive time timing signal, said discharge flip-flop means being further connected to said charge flip-flop means to reset said charge flip-flop means when in the set condition; and
            II. discharge coincidence means connected to said discharge flip-flop means and said charge flip-flop means for generating said discharge signal while said charge flip-flop is set if said discharge flip-flop is not set;
         iii. charge pump means connected to said phase comparison means and said data separator means for generating said control signal having a voltage level related to said charge and discharge output signals and an offset signal;
   C. input latch reset means connected to said charge flip-flop means for resetting said input latch means in response to the setting of said charge flip-flop means;
   D. data separator means for generating said data signal and said offset signal in response to said input signal and said timing signals, said offset signal representing the degree of correlation between the timing signals and the input signal as received by said data separator means.

9. A data decoding circuit for receiving an input signal comprising a pulse stream and generating in response thereto a data signal and timing signals comprising:
   A. phase-locked loop means for generating said timing signals in response to said input signal and an offset signal, said timing signals comprising a free-running timing signal defined by a series of pulses having a selected frequency and a bit cell timing signal and a receive time timing signal both defined by a series of pulses of one half said selected frequency and alternatingly contemporaneous with pulses of said free-running timing signal;

B. data separator means comprising:
  i. data separator input means for latching said input signal and generating an output signal in response thereto and said free-running timing signal from said phase-locked loop means, said data separator input means including an input flip-flop means having a set condition, a reset condition and a metastable condition and clocked in response to said free-running timing signal to the set or reset condition in response to the receipt or non-receipt of said input signal a selected time before said free-running timing signal, and otherwise being clocked to said metastable condition which resolves to a set condition or a reset condition a predetermined time thereafter;
  ii. data value establishing means connected to said data separator input means for generating a data output signal in response to the output signal from said data separator input means and said receive time timing signal from said phase-locked loop means, said data value establishing means including a data value flip-flop means having a set condition and a reset condition and being clocked in response to said receive time timing signal to a set condition by said receive time timing signal if said input flip-flop means is set, and otherwise being reset;
  iii. offset means comprising:
    a. offset flip-flop means having a set condition and a reset condition, said offset flip-flop means being connected to said input flip-flop means and clocked by said bit cell timing signal, in response to the receipt of an input signal, to a set condition if said input flip-flop means is in its set condition and to a reset condition if said input flip-flop is in its reset condition;
    b. integrator means connected to said offset flip means for generating the offset signal indicative of the average condition of said offset flip-flop means over a selected period of time.

10. A data decoding circuit for receiving an input signal comprising a pulse stream and generating in response thereto a data signal and timing signal comprising:
  A. an input latch for generating said input signal in response to the receipt of a data signal;
  B. phase-locked loop means comprising:
    i. voltage controlled oscillator means for generating timing signals in response to a control signal, said voltage controlled oscillator means generating a free-running timing signal defined by a series of pulses having a selected frequency and a bit cell timing signal and a receive time timing signal both defined by a series of pulses of one half said selected frequency and alternatingly contemporaneous with pulses of said free-running timing signal; and
    ii. phase comparison means comprising:
      a. charge means comprising:
        I. charge flip-flop means having a set condition and a reset condition, said charge flip-flop means being connected to receive said input signal and clocked in response to a bit cell timing signal to the set condition if said input signal is in an asserted condition contemporaneous with the receipt of said bit cell timing signal; and
        II. charge coincidence means connected to said charge flip-flop means for generating said charge signal in response to the receipt of said input signal while said charge flip-flop means is in a reset condition;
      b. discharge means comprising:
        I. discharge flip-flop means having a set condition and a reset condition, said discharge flip-flop means being connected to receive an output signal from said charge flip-flop means and clocked in response to a receive time timing signal to the set condition if said charge flip-flop is in the set condition contemporaneous with the receipt of said receive time timing signal, said discharge flip-flop means being further connected to said charge flip-flop means to reset said charge flip-flop means when in the set condition; and
        II. discharge coincidence means connected to said discharge flip-flop means and said charge flip-flop means for generating said discharge signal while said charge flip-flop is set if said discharge flip-flop is not set;
    iii. charge pump means connected to said phase comparison means and said data separator means for generating said control signal having a voltage level related to said charge and discharge output signals and an offset signal;
  C. input latch reset means connected to said charge flip-flop means for resetting said input latch means in response to the setting of said charge flip-flop means;
  D. data separator means comprising:
    i. data separator input means for latching said input signal and generating an output signal in response thereto and said free-running timing signal from said phase-locked loop means, said data separator input means including an input flip-flop means having a set condition, a reset condition and a metastable condition and clocked in response to said free-running timing signal to the set or reset condition in response to the receipt or non-receipt of said input signal a selected time before said free-running timing signal, and otherwise being clocked to said metastable condition which resolves to a set condition or a reset condition a predetermined time thereafter;
    ii. data value establishing means connected to said data separator input means for generating a data output signal in response to the output signal from said data separator input means and said receive time timing signal from said phase-locked loop means, said data value establishing means including a data value flip-flop means having a set condition and a reset condition and being clocked in response to said receive time timing signal to a set said input flip-flop means is set, and otherwise being reset; and
    iii. offset means comprising:
      a. offset flip-flop means having a set condition and a reset condition, said offset flip-flop means being connected to said input flip-flop means and clocked by said bit cell timing signal, in response to the receipt of an input signal, to a set condition if said input flip-flop means is in its set condition and to a reset condition if said input flip-flop is in its reset condition; and b. integrator means connected to said offset flip-flop means for generating the offset signal indicative of the average condition of said offset flip-flop means over a selected period of time.

11. A phase-locked loop circuit comprising:

A. voltage controlled oscillator means for generating timing signals in response to a control signal, said voltage controlled oscillator means generating a free-running timing signal defined by a series of pulses having a selected frequency and a bit cell timing signal defining a bit cell and a receive time timing signal both defined by a series of pulses of one half said selected frequency and alternatingly contemporaneous with pulses of said free-running timing signal; and B. phase comparison means comprising:
 i. charge means connected to receive said input signal and said bit cell timing signal for generating said charge signal from the beginning of said input signal to the end of said bit cell; and
 ii. discharge means connected to said charge means and connected to receive said receive time timing signal for generating said discharge signal from the end of said charge signal to said receive time signal;

C. charge pump means connected to said phase comparison means and said voltage controlled oscillator means for generating the control signal, the control signal having a voltage level related to said charge and discharge output signals and to an offset signal that represents the degree of correlation between the timing signals and the input signal.

12. A phase-locked loop circuit as defined in claim 11 wherein:

A. said charge means comprises:
 i. charge flip-flop means having a set condition and a reset condition, said charge flip-flop means being connected to receive said input signal and clocked in response to said bit cell timing signal to the set condition if said input signal is in an asserted condition contemporaneous with the receipt of said bit cell timing signal; and
 ii. charge coincidence means connected to said charge flip-flop means for generating said charge signal in response to the receipt of said input signal while said charge flip-flop means is in a reset condition;

B. said discharge means comprises:
 i. discharge flip-flop means having a set condition and a reset condition, said discharge flip-flop means being connected to receive an output signal from said charge flip-flop means and clocked in response to said receive time timing signal to the set condition if said charge flip-flop is in the set condition contemporaneous with the receipt of said receive time timing signal, said discharge flip-flop means being further connected to said charge flip-flop means to reset said charge flip-flop means when in the set condition; and
 ii. discharge coincidence means connected to said discharge flip-flop means and said charge flip-flop means for generating said discharge signal while said charge flip-flop is set if said discharge flip-flop is not set.

13. A phase-locked loop circuit as defined in claim 12 further comprising an input latch means for generating said input signal in response to the receipt of a data signal and input latch reset means connected to said charge flip-flop means for resetting said input latch means in response to the setting of said charge flip-flop means.

14. A data separator circuit for receiving an input signal comprising a pulse stream and timing signals comprising a free-running timing signal defined by a series of pulses having a selected frequency and a bit cell timing signal and a receive time timing signal both defined by a series of pulses of one half said selected frequency and alternatingly contemporaneous with pulses of said free-running timing signal, said data separator circuit comprising:

A. data separator input means for latching said input signal and generating an output signal in response thereto and said free-running timing signal from said phase-locked loop means, said data separator input means including an input flip-flop means having a set condition, a reset condition and a metastable condition and clocked in response to said free-running timing signal to the set or reset condition in response to the receipt or non-receipt of said input signal a selected time before said free-running timing signal, and otherwise being clocked to said metastable condition which resolves to a set condition or a reset condition a predetermined time thereafter;

B. data value establishing means connected to said data separator input means for generating a data output signal in response to the output signal from said data separator input means and said receive time timing signal from said phase-locked loop means, said data value establishing means including a data value flip-flop means having a set condition and a reset condition and being clocked in response to said receive time timing signal to a set condition by said receive time timing signal if said input flip-flop means is set, and otherwise being reset; and C. offset means connected to said data separator input means for generating said offset signal in response to the output signal from said data separator input means, said input signal and said bit cell timing signal from said phase-locked loop means, said offset means being connected to said data separator input means and generating said offset signal in response to the average condition of said input flip-flop means over a predetermined period of time.

15. A data separator circuit as defined in claim 14 in which said offset means comprises:

A. offset flip-flop means having a set condition and a reset condition, said offset flip-flop mean being connected to said input flip-flop means and clocked by said bit cell timing signal, in response to the receipt of an input signal, to a set condition if said input flip-flop means is in its set condition and to a reset condition if said input flip-flop is in its reset condition; and B. integrator means connected to said offset flip-flop means for generating the offset signal indicative of the average condition of said offset flip-flop means over a selected period of time.

16. A method of generating a data signal and timing signals comprising the steps of:

A. generating timing signals in response to a control signal, said timing signals comprising a free-running timing signal defined by a series of pulses having a selected frequency and a bit cell timing signal defining a bit cell and a receive time timing signal both defined by a series of pulses of one half said selected frequency and alternatingly contemporaneous with pulses of said free-running timing signal B. generating a charge signal for a period of time starting from the beginning of said input signal to the end of said bit cell;

C. generating a discharge signal for a period of time starting from the end of said charge signal to said receive time timing signal;

D. generating the control signal having a voltage level related to said charge and discharge output signals and an offset signal;

E. generating said data signal and said offset signal in response to said input signal and said timing signal, said offset signal representing the degree of correlation between the timing signals and the input signal as received by said data separator means.

17. A method of generating a timing signals having a predetermined relationship to an input signal comprising the steps of:

A. generating timing signals in response to a control signal, said timing signals comprising a free-running timing signal defined by a series of pulses having a selected frequency and a bit cell timing signal defining a bit cell and a receive time timing signal both defined by a series of pulses of one half said selected frequency and alternatingly contemporaneous with pulses of said free-running timing signal B. generating a charge signal for a period of time starting from the beginning of said input signal to the end of said bit cell;

C. generating a discharge signal for a period of time starting from the end of said charge signal to said receive time timing signal;

D. generating the control signal having a voltage level related to said charge and discharge output signals and to an offset signal that represents the degree of correlation between the timing signals and the input signal.

18. A method of generating, in response to an input signal, a data output signal and an offset signal, the offset signal representing the degree of correlation between the input signal and timing signals, comprising the steps of:

A. latching an input signal in an input flip-flop in response to a free-running timing signal, said input flip-flop having a set condition, a reset condition and a metastable condition and clocked in response to the free-running timing signal to the set or reset condition in response to the receipt or non-receipt of said input signal a selected time before a free-running timing signal, and otherwise being clocked to said metastable condition which resolves to a set condition or a reset condition a predetermined time thereafter, said input flip-flop generating an output signal;

B. generating the data output signal in response to the output signal from said input flip-flop and a timing signal, said data value establishing means including a data value flip-flop having a set condition and a reset condition and being clocked in response to a receive time timing signal to a set condition by said receive time timing signal if said input flip-flop is set, and otherwise being reset; and C. generating the offset signal in response to the average condition of said input flip-flop over a predetermined period of time.

* * * * *

UNITED STATES PATENT AND TRADEMARK OFFICE
CERTIFICATE OF CORRECTION

PATENT NO. : 4,908,841

DATED : March 13, 1990

INVENTOR(S) : Michael Leis, et al

It is certified that error appears in the above-identified patent and that said Letters Patent is hereby corrected as shown below:

Column 7, line 19, "C1, C1" should be --C1, C2--.

Column 7, line 37, "C2 and C2" should be --C2 and C3--.

Column 12, line 25, "C1 C2" should be --C1, C2--.

Column 14, line 56 "mean" should be --means--.

Column 15, line 43, "claim 4" should be --claim 6--.

Column 15, line 46, "mean" should be --means--.

Column 17, line 44, "signal" should be --signals--.

Column 18, line 59, insert --condition by said receive time timing signal if-- after "set".

Column 19, line 28, insert --timing-- after "time".

Signed and Sealed this

Seventh Day of April, 1992

Attest:

HARRY F. MANBECK, JR.

Attesting Officer

Commissioner of Patents and Trademarks